United States Patent [19]

Fallon et al.

[11] 4,019,143
[45] Apr. 19, 1977

[54] STANDBY APPARATUS FOR CLOCK SIGNAL GENERATORS

[75] Inventors: Joseph Michael Fallon, Old Bridge Township, Middlesex County; Nathan Harold Stochel, Edison, both of N.J.

[73] Assignee: Bell Telephone Laboratories, Incorporated, Murray Hill, N.J.

[22] Filed: May 10, 1976

[21] Appl. No.: 684,717

[52] U.S. Cl. .................. 328/71; 328/61; 328/55; 328/72; 331/49; 331/55; 307/219

[51] Int. Cl.² ........................ H03K 1/17

[58] Field of Search ............. 328/55, 61, 71, 72, 328/155; 331/49, 55; 307/219

[56] References Cited
UNITED STATES PATENTS

3,329,905  7/1967  Niertit et al. ............... 307/219 X
3,803,568  4/1974  Higashide ................... 307/219 X
3,900,741  8/1975  Fletcher et al. ............. 307/219 X
3,961,270  6/1976  Ullmann et al. ............. 307/219 X
3,965,432  6/1976  Denenberg et al. ............... 328/61

Primary Examiner—John S. Heyman
Attorney, Agent, or Firm—Roy C. Lipton

[57] ABSTRACT

A clock output signal is aligned in phase to conicide with the phase of signals derived from a master clock. In the event that there is a malfunction of the master, standby control circuitry modifies the phase of the clock output signal incremental quantities until it is in phase with the phase of signals from a standby clock. The clock output signal is thereafter maintained aligned in phase to coincide with the phase of the signals derived from the standby clock.

10 Claims, 5 Drawing Figures

STANDBY APPARATUS FOR CLOCK SIGNAL GENERATORS

FIELD OF THE INVENTION

This invention relates to redundant clock or timing signal systems and, more particularly, to standby circuits which ensure uninterrupted service in the event of a malfunction of a timing signal source.

DESCRIPTION OF THE PRIOR ART

In synchronous signaling systems, such as time-division multiplex systems, it is necessary to have a continuous and uninterrupted timing signal to properly assemble and disassemble frames (or bytes) of data bits. The timing signal constitutes a bit clock signal for defining each bit signal interval and a framing signal (whose repetition rate is a submultiple of the bit clock rate) for defining each frame interval. The timing signal generator circuit preferably comprises a master clock oscillator and a standby clock oscillator, each oscillator producing a bit clock signal and a countdown thereof to produce a frame clock signal. Advantageously, the bit and frame clock timing signals for the time-division system are normally derived from the master clock. In the event of a malfunction of the master, equipment automatically switches over to the standby clock which then provides the bit and frame clock signals for the time-division system.

When switchover occurs, it it important that it is not accompanied by substantial phase shift, called phase discontinuity. Phase discontinuity could result in errors in the data stream that is being timed by the clock signals, such errors including insertion and deletion of data bits.

A redundant clock system for providing bit and frame clock signals is disclosed in U.S. Pat. No. 3,795,972, issued Mar. 5, 1974 to O. Napolitano, G. P. Pasternack and B. R. Saltzberg. In this system, the master clock and the standby clock include phase-locked oscillators which are normally phase locked to the same incoming source of reference signals. The clock outputs, derived from countdown circuits driven by the oscillators, are thereby in phase whereby switching normally does not cause phase discontinuity. In the event, however, that the master clock has a malfunction that causes it to drift, the standby clock signal is no longer in phase with the master and switching to the standby then could result in phase discontinuity.

It is an object of this invention to eliminate phase discontinuity caused by switching of the clock outputs.

It is also known to phase lock a standby clock to the output of the master clock. If the master clock fails, the above-described output switching occurs and, in addition, the standby clock unlocks from the master and phase locks to the reference. Although the standby clock now restores to the phase of the reference which was presumably lost by the master, the transition can be arranged to be sufficiently slow and smooth so as to prevent discontinuity. However, if the master clock malfunction was causing the master clock to drift, the tracking of the master by the standby, being slow, does not maintain the standby clock output phase aligned with the master output and switching to the standby could still result in phase discontinuity.

It is therefore a more specific object of this invention to overcome phase discontinuity which occurs when switching of the clock outputs is due to a master clock malfunction causing the master clock to drift.

SUMMARY OF THE INVENTION

In accordance with this invention, the clock system has control circuitry having three modes or states. During two of the states, signals are produced phase-aligned with a first source of timing signals (the master clock signals) and with a second source of timing signals (the standby clock signals). During an intermediate correction state, produced signals are modified in phase incremental quantities to compensate for phase differences between the first and second sources. Accordingly, smooth transitions are provided for the correction state (which advantageously occurs when the clock output are switched) regardless of drifting of the master clock and lack of or delay of tracking of the master by the standby clock.

The illustrative clock control system includes a pair of framing pulse producers, individually associated with the master clock and the standby clock. The phases of both pulse producers are aligned to coincide with signals from the master. If there is a clock malfunction, phase aligning is terminated and the phase of the pulse producer associated with the standby is modified incremental quantities until there is coincidence of the phases of the standby pulse producer and signals from the standby, whereupon the phases of the pulse producers are aligned to coincide with the signals from the standby. The output frame clock signals are initially derived from the pulse producer associated with the master until the clock malfunction when the output is switched over to derive frame clock signals from the standby pulse producer. Accordingly, since the pulse producers are phase aligned with signals from the master, there is no phase discontinuity when the outputs are switched. Moreover, since the standby pulse producer phase is modified incremental quantities when switching occurs, restoration to the phase of the standby clock is smooth so as to prevent discontinuity.

In accordance with the specific illustrative embodiment of this invention, each pulse producer counts the high speed bit clock signals from the associated clock, producing a pulse after a count which corresponds to the ratio of the bit clock rate to the frame clock rate whereby the produced pulse is at the frame clock rate. The pulse producers are phase aligned with the clocks by initiating counts in response to framing signals derived from the clocks. The pulse producers are phase modified incremental quantities by adding and deleting bit clock signals being counted to thereby advance and retard the phases of the pulse producers.

The foregoing and other objects and features of this invention will be more fully understood from the following description of the illustrative embodiment taken in conjunction with the accompanying drawings.

BRIEF DESCRIPTION OF THE DRAWINGS

In the drawing:

FIGS. 2 and 3 when arranged as shown in FIG. 4 depicts the details of the circuits and equipment which form the clock control system.

DETAILED DESCRIPTION

Figure 1:
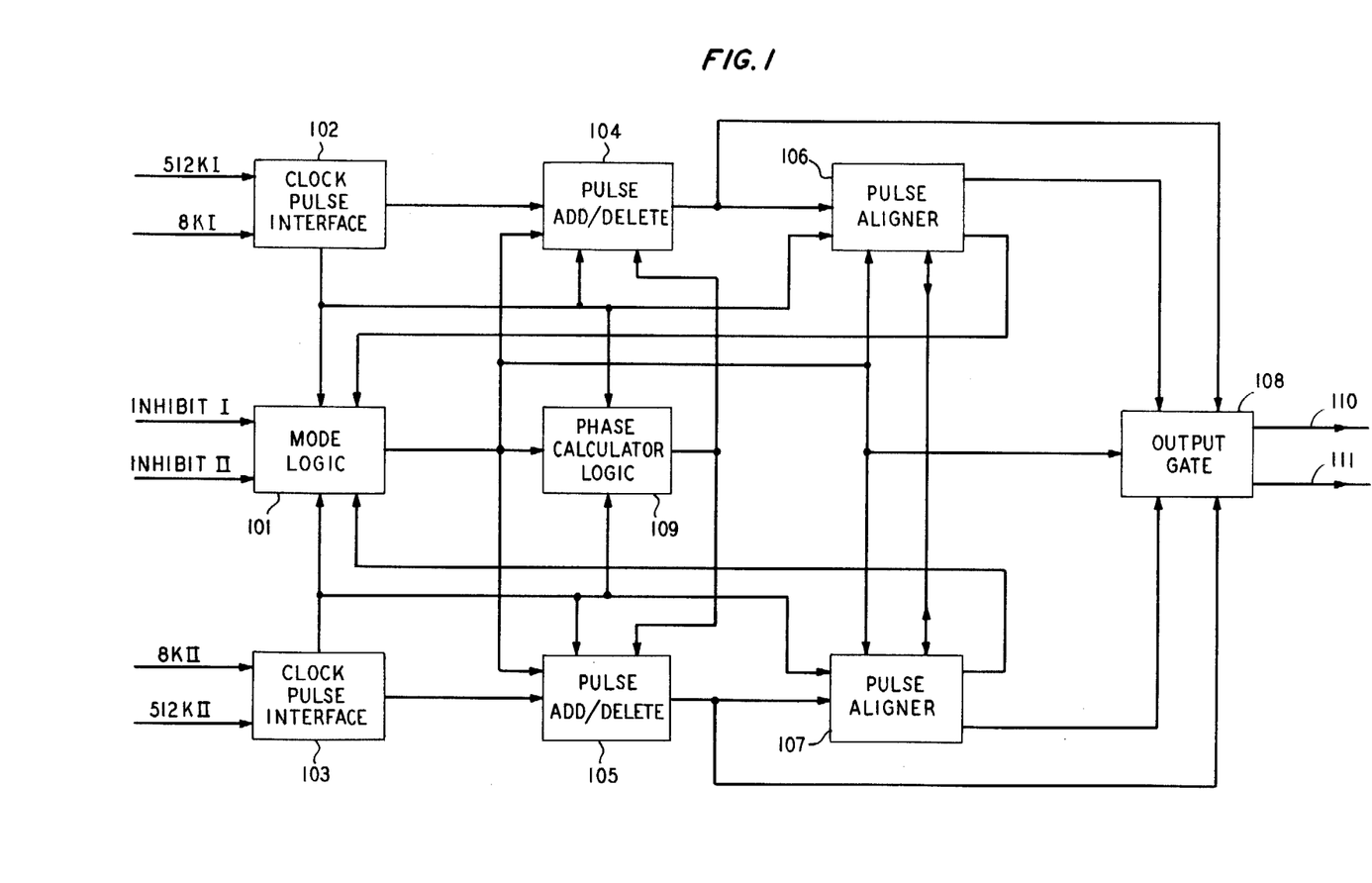
FIG. 1 shows, in block form, a clock control system in accordance with this invention.

The present invention generally functions to accept the 512 kHz and 8 kHz clocking signals from a master clock and from a standby clock of the types described in the Napolitano et al patent and pass timing signals derived from the master clock to output leads 110 and 111, as seen in FIG. 1, under the condition that the master clock is operating properly. Alternatively, the present invention is arranged, in the event that the master clock is operating improperly and the standby clock is operating properly, to pass the timing signals derived from the standby clock to leads 110 and 111. This operation is generally controlled by mode logic circuit 101.

Mode logic circuit 101 receives signals on leads INHIBIT I and INHIBIT II, which leads advantageously extend to correspondingly identified leads shown in the Napolitano et al patent. As described in the Napolitano et al patent, 0 bits are applied to lead INHIBIT I when the master clock is operating properly and 1 bits are applied to the lead in the event that the master clock is operating improperly. Similarly, 0 bits are applied to lead INHIBIT II when the standby clock is operating properly. Mode logic circuit 101 has four states; namely, a normal master clock mode state, a standby clock mode state, a standby clock correction mode state and a master clock correction mode state. When the master clock is operating properly and 0 bits are being applied to lead INHIBIT I, mode logic circuit 101 is in its normal master clock mode state.

The 512 kHz clocking signal and the 8 kHz clocking signal from the master clock are applied to leads 512K I and 8K I, respectively, by master clock phase lock loop 105 via leads 512K and 8K, as shown in FIG. 1 of the Napolitano et al patent. These timing signals are passed to clock pulse interface circuit 102, which applies the kHz signal (inverted) to pulse add/delete circuit 104 and converts the 8 kHz signal to an 8 kb/s strobe pulse which is applied to mode logic circuit 101, pulse add/delete circuit 104, pulse aligner circuit 106 and phase calculator logic circuit 109. Similarly, clock pulse interface circuit 103 accepts the 512 kHz and 8 kHz timing waves from the standby clock shown in the Napolitano et al patent, passes the 512 kb/s pulse, inverted, to pulse add/delete circuit 105 and converts the 8 kHz timing signal to an 8 kb/s strobe pulse, passing the strobe pulse to mode logic circuit 101, pulse add/delete circuit 105, pulse aligner circuit 107 and phase calculator logic 109.

Assume now that the master clock is operating properly and mode logic circuit 101 is in the normal master clock mode. The 512 kb/s clock signal output of clock pulse interface 102 derived from the 512 kHz timing signal from the master clock is passed, by pulse add-/delete circuit 104 without change or correction, to pulse aligner 106 and output gate 108. Output gate 108, with mode logic 101 in the normal master clock mode, is arranged to pass the 512 kb/s pulse to output lead 110. At the same time, pulse aligner 106, through the utilization of an internal recirculating register, described in detail hereinafter, which is driven by the 512 kb/s pulses from pulse add/delete circuit 104, generates 8 kb/s strobe pulses and exactly aligns, in phase, these generated stobe pulses with the 8 kb/s strobe pulses provided by clock pulse interface 102. These aligned 8 kb/s strobe pulses are passed to output gate 108 which, in the normal master clock mode, is arranged to convert them to 8 kHz timing signals and to pass the timing signals to output lead 111.

The 512 kb/s pulses provided by clock pulse interface 103 are passed through pulse add/delete circuit 105 without additional deletion of pulses and are applied to output gate 108, which blocks these pulses in the normal master clock mode and are applied to pulse aligner 107. Pulse aligner 107 utilizes these 512 kb/s pulses derived from the standby clock to drive the recirculating register therein. In the normal master clock mode, the 8 kb/s strobe pulse applied to pulse aligner 106 is passed on to pulse aligner 107 which aligns, in phase, the strobe pulse generated by the recirculating register with the strobe pulse derived from the master clock. Both recirculating registers are therefore aligned with the master clock and with each other. The aligned 8 kb/s strobe pulse of pulse aligner 107 is blocked however, by output gate 108 when the circuit is in the normal master clock mode. Output leads 110 and 111, therefore, only carry timing signals derived from the master clock.

In the normal master clock mode, phase calculator logic 109 calculates the phase lead or lag of the 8 kb/s strobe pulse derived from the standby clock and provided by clock pulse interface 103 with the 8 kb/s strobe pulse derived from the master clock and provided by clock pulse interface 102.

In the event that there is a master clock malfunction, 1 bits are provided to lead INHIBIT I and mode logic 101 advances to the standby clock correction mode. In this mode, output gate switches the output from the timing waves derived from the master clock to the timing waves derived from the standby clock. The 512 kb/s output of pulse add/delete circuit 104 and the aligned 8 kb/s strobe pulse output of pulse aligner 106 are blocked by output gate 108 which now passes to lead 110 the 512 kb/s output of pulse add/delete circuit 105 and passes to lead 111 and 8 kHz timing wave derived from the 8 kb/s strobe pulse output of pulse aligner 107. Since the recirculating registers in pulse aligners 106 and 107 are aligned with each other, there is no phase discontinuity in the 8 kHz wave due to the switchover.

In the standby clock correction mode, the recirculating registers in pulse aligners 106 and 107 are released, in phase, from the 8 kb/s strobe pulses derived from the master clock by way of clock phase interface 102 and are rendered free running, advancing and recycling solely in response to the driving pulses derived from the respective 512 kb/s signals applied thereto. The calculation previously made as to the phase lead or lag of the standby clock 8 kHz timing signal relative to the master clock 8 kHz timing signal is frozen in phase calculator logic 109 which now ignores the strobe pulses from the interface circuits with mode logic 101 in the correction mode. If phase calculator logic 109 indicates that the standby clock lags the master clock, pulse add/delete circuit 105, with mode logic 101 in the standby clock correction mode, is instructed to periodically delete an individual pulse in the 512 kb/s pulse stream. The deletion of each pulse results in a slight retardation in the phase of the recirculating register in pulse aligner 107 to compensate for the phase lag of the standby clock. This pulse deletion is continued until there is a coincidence of the 8 kb/s strobe pulse output of clock pulse interface 103 and the (aligned) 8 kb/s strobe pulse output of pulse aligner 107. This coincidence is recognized by mode logic 101 which thereupon goes to the standby clock mode.

Alternatively, if the standby clock leads in phase, pulse add/delete circuit 105 inserts additional pulses into the 512 kb/s pulse stream. This advances the recirculating register in pulse aligner 107 to compensate for the standby clock phase lead. When coincidence of the 8 kb/s strobe pulse output of clock pulse interface 103 and the (aligned) 8 kb/s pulse output of pulse aligner 107 occurs, mode logic 101 similarly goes to the standby clock mode.

In the standby clock mode, phase calculator logic 109 is enabled to calculate, on the fly, the lead or lag of the master clock 8 kb/s strobe pulse relative to the standby clock 8 kb/s strobe pulse. At the same time, the strobe pulse derived from the standby clock is now aligning the recirculating register in pulse aligner 107 and pulse aligner 107 forwards the strobe pulse to the recirculating register in pulse aligner 106. The recirculating register in phase aligner 106 and the recirculating register in phase aligner 107 are aligned with each other and are both exactly aligned with the 8 kb/s strobe pulse provided by clock pulse interface 103 and derived from the standby clock. As previously noted, output gate 108 is applying waves derived from the 512 kb/s output of pulse add/delete circuit 105 and from the 8 kb/s output of pulse aligner 107 to output leads 110 and 111. Accordingly, timing waves derived from the standby clock are now passed by output gate 108 to output leads 110 and 111.

If the master clock malfunction is cleared, 0 bits are passed to mode logic 101 by way of lead INHIBIT I. Mode logic 101 thereupon goes to the master clock correction mode. In this mode the 512 kb/s output of pulse add/delete circuit 104 and the 8 kb/s strobe pulse output of pulse aligner 106 are again passed by output gate 108 to output leads 110 and 111. The control of the phase of the recirculating registers in pulse aligners 106 and 107 is taken away from the strobe pulse derived from the standby clock. Pulse add/delete circuit 104 procedes to add or delete pulses in the 512 kb/s pulse stream to advance or retard the phase of the register in aligner 106 to compensate for the lead or lag of the phase of the master clock 8 kHz timing wave. When coincidence is obtained between the 8 kb/s strobe pulse output of clock interface 102 and the 8 kb/s strobe pulse output of pulse aligner 106, mode logic 101 returns to the normal master clock mode and the circuit supplies timing signals derived from the master clock to output leads 110 and 111 in the same manner as previously described.

As previously noted, the state of mode logic circuit 101 is determined, in part, by the states of the master clock and the standby clocks shown in the Napolitano et al patent. As described in the patent, when the master clock, depicted as phase lock loop 105, is operating properly, lead INHIBIT I has 0 bits applied thereto and alternatively, if the master clock is operating improperly, lead INHIBIT I has 1 bits applied thereto. Similarly, when the standby clock, shown as phase lock loop 106, is operating properly, 0 bits are applied to lead INHIBIT II and alternatively, when the standby clock is operating improperly, 1 bits are applied to lead INHIBIT II.

Figure 2:
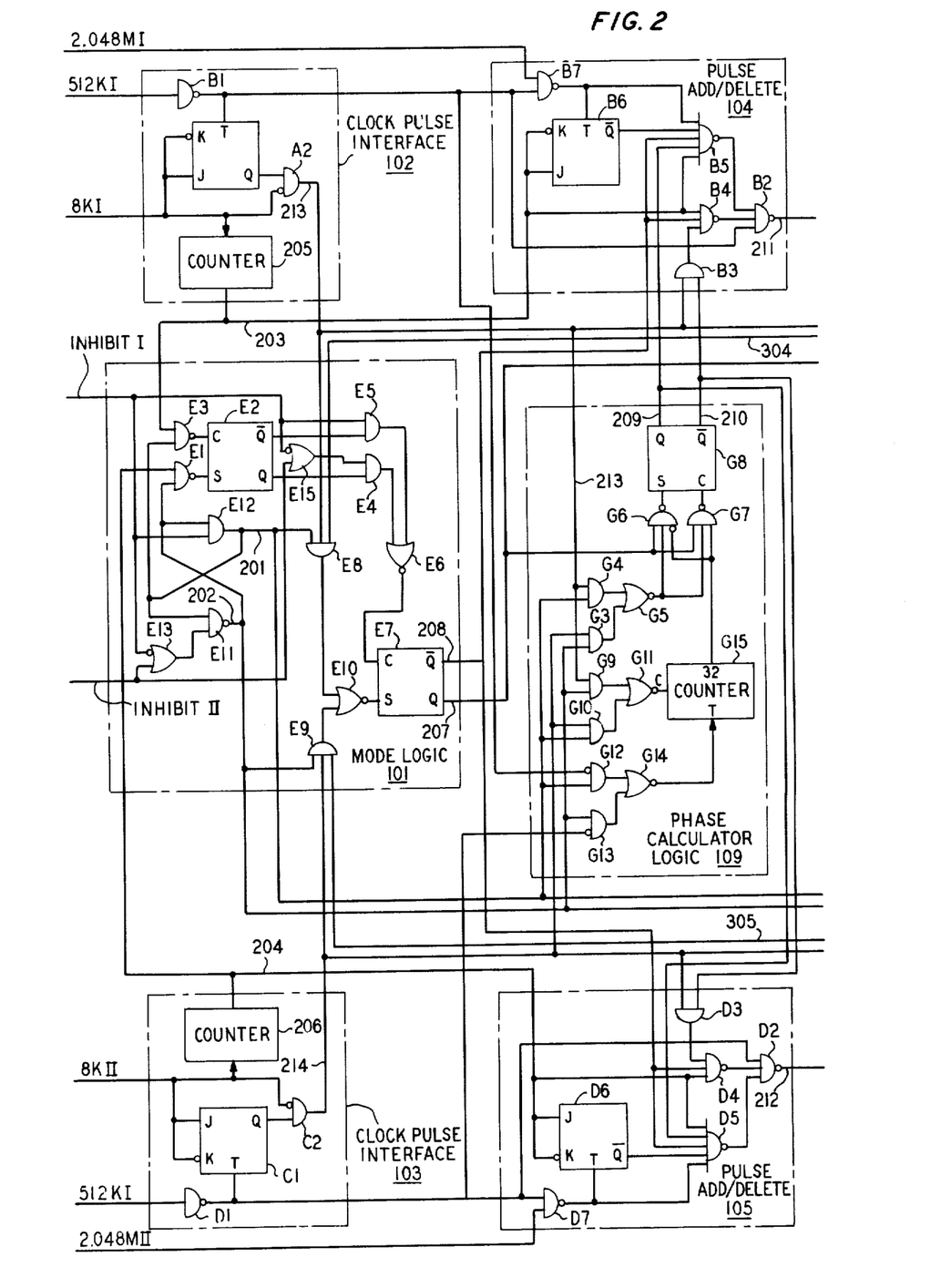

Assume that the master clock is operating properly. The 0 bits applied to lead INHIBIT I are passed to NAND gate E12 in mode logic circuit 101, as seen in FIG. 2. These 0 bits are also inversely applied through OR gate E13 to provide 1 bits to NAND gate E11. Gates E11 and E12 are cross connected to form a flip-flop. The 0 bits applied to NAND gate E12 result in a high condition at the gate output and this high condition together with the 1 bits from OR gate E13 drive the output of NAND gate E11 low. This low condition, being applied to the input of NAND gate E12, holds the flip-flop in a first stable state. Alternatively, if the master clock is operating improperly and the standby clock is operating properly, the consequent 1 bits applied to lead INHIBIT I are applied to NAND gate E12 and at the same time the 1 bits previously applied to NAND gate E11 are removed. The output of NAND gate E11 goes high and this high condition is applied to NAND gate E12 with the 1 bits from lead INHIBIT I to drive the output of the gate low. The low output of gate E12 is applied to the input of gate E11 to hold the flip-flop in a second stable state.

Assume first that the E11, E12 flip-flop is in the first stable state. Output lead 201 of the flip-flop is therefore high and output lead 202 is low. The high condition on lead 201 enables NAND gate E3. kb/s clock repetition The other input to NAND gate E3 comprises lead 203 which extends from counter 205 in clock pulse interface 102. The input to counter 205 is advantageously obtained from the 8K I lead which carries the 8 kb/sclock signal derived from the master clock shown in the Napolitano et al patent. The output of counter 205 goes high at one specific count of the counter. The counter has a plurality of stages sufficient in number to provide an output pulse having a very low repetiton rate with respect to the 8 kb/s clock, the output pulse having a width corresponding to an 8 kb/s clock cycle.

At the occurrence of the counter 205 output pulse, the output of NAND gate E3 goes low clearing flip-flop E2. The $\overline{Q}$ output of flip-flop E2 thereupon goes high to partially enable gate E5. At this time, lead INHIBIT I has 0 bits applied thereto, as previously described, and gate E5 passes the 0 bits to NOR gate E6 which applies a high condition to the clear input of flip-flop E7. As explained hereinafter, flip-flop E7 is normally in the set state providing a high potential through its Q output to lead 207 and a low potential through its $\overline{Q}$ output to lead 208. The high output of gate E3 does not change the set state of flip-flop E7. Flip-flop E11, E12 in the first stable state and flip-flop E7 in the set state constitutes the normal master clock mode or state of mode logic circuit 101 when the master clock is operating properly.

The 512 kb/s output from the master clock on lead 512K I is inverted by inverter B1 in clock pulse interface 102 and passed to NAND gate B2 in pulse add/delete circuit 104. One input to NAND gate B2 is provided by NAND gate B4 whose output is normally high because of the low input provided by lead 208. The other input to NAND gate B2 is provided by NAND gate B5 whose output is also normally high due to the low condition on input lead 208. NAND gate B2 is therefore enabled to reinvert the 512 kb/s signal output of inverter B1 derived from the master clock.

Figures 3, 4:
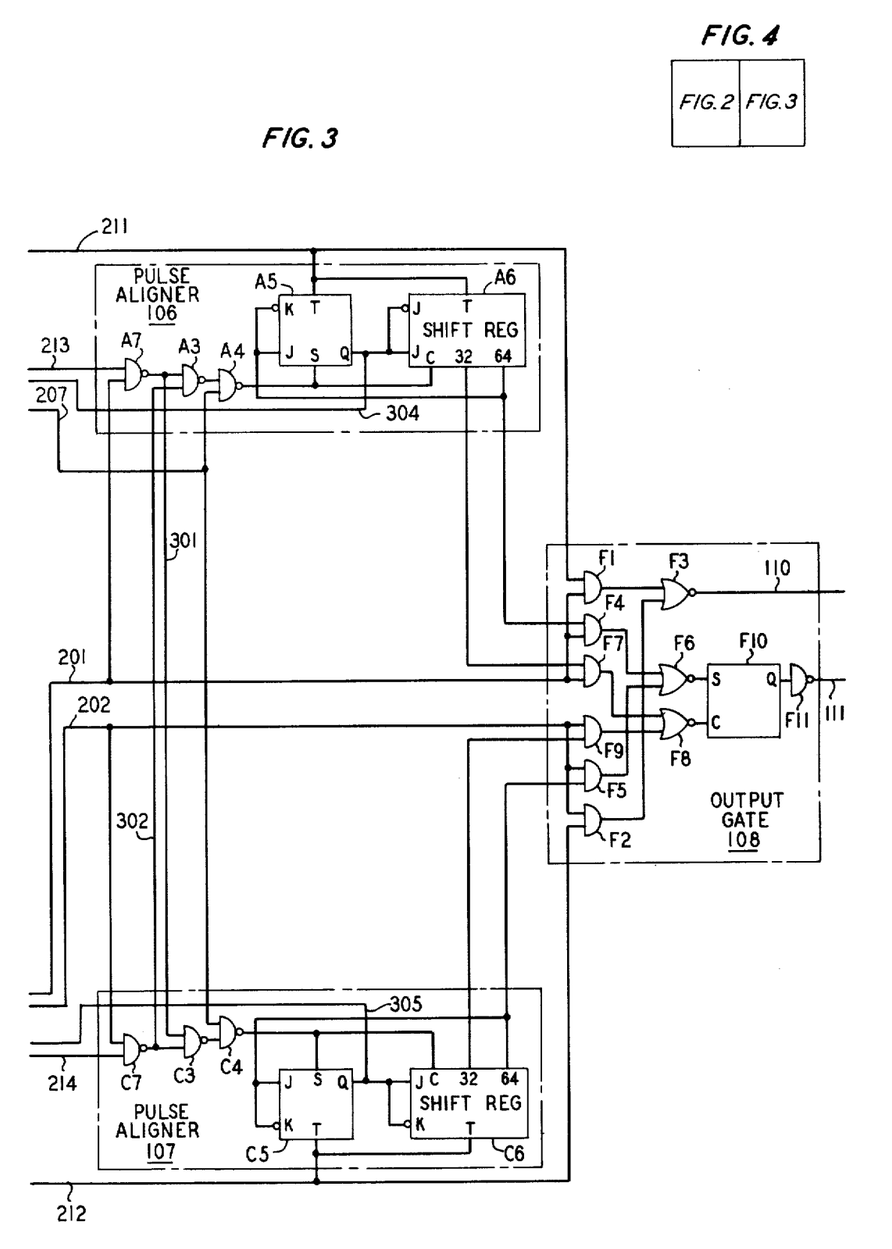

The 512 kb/s signal output of gate B2 is passed via lead 211 to AND gate F1 in output gate circuit 108 shown in FIG. 3. AND gate F1 is enabled by the high condition on lead 201. Gate F1 thereby passes the 512 kb/s signal through NOR gate F3 to output lead 110. Accordingly, the 512 kb/s signal derived from the master clock is passed to the output lead 110 when mode logic circuit 101 is in the normal master clock mode.

The 512 kb/s signal output of NAND gate B2 on lead 211 also toggles a 64 kb/s recycling shift register in pulse aligner circuit 106. The recycling shift register constitutes flip-flop A5 and shift register A6 which includes 63 stages. The Q output of flip-flop A5 is connected to the J input and inversely connected to the K input of the first stage of shift register A6 and the final stage output B64 of register A6 is connected to the J input and inversely connected to the K input of flip-flop A5. The flip-flop and register are therefore arranged as a 64-stage recycling shift register. As described hereinafter, the 64-stage register has one 1 bit and 63 0 bits inserted therein and the 512 kb/s signal output of gate B2 is connected to the toggle inputs of flip-flop A5 and shift register A6. The recirculating shift register is thereby clocked at a 512 kHz rate whereby the 1 bit circulates at an 8 kHz rate. As further described hereinafter, the 1 bit in the recirculating shift register is aligned with the 8 kb/s signal from the master clock.

When the 1 bit in register A6 passes to the last stage, it appears at output terminal B64 and is passed to AND gate F4 in output gate 108. AND gate F4 is enabled by the high condition on lead 201 to pass the 1 bit therethrough to NOR gate F6 which thereupon sets flip-flop F10. The Q output of flip-flop F10 goes high and this high condition is inverted by inverter F11 to pass a low condition to output lead 111.

The 512 kb/s signal on lead 211 continues to cycle the 1 bit in the recirculating shift register, shifting the 1 bit from the last stage of register A6 to flip-flop A5 and, as described hereinafter, this recycling of the 1 bit to flip-flop A5 is aligned with the 8 kb/s signal from the master clock. The 512 kb/s signal on lead 211 continues to shift the 1 bit, passing the bit to the first stage in register A6 and then shifting the 1 bit through the subsequent stages until it reaches the 31st stage, At that time the 1 bit appears at output terminal B32 and is passed to AND gate F7 in output gate 108. AND gate F7 is enabled by the high condition on lead 201, applying the 1 bit to NOR gate F8. The low condition produced at the output of NOR gate F8 clears flip-flop F10. Output lead Q thereupon goes low and inverter F11 applies a high condition to output lead 111. The signal on output lead 111 is therefore an 8 kb/s signal aligned with the 8 kb/s signal from the master clock.

The 512 kb/s signal on lead 512K II from the standby clock is inverted by inverter D1 in clock pulse interface circuit 103 (FIG. 2) and passed to NAND gate D2. The other inputs to NAND gate D2 are provided by NAND gates D4 and D5 and both these latter gates are disabled by the low condition on input lead 208. Both NAND gates therefore apply high potentials to NAND gate D2 and the enabled NAND gate passes, inverted, the 512 kb/s signal from inverter D1.

The output of NAND gate D2 is applied via lead 212 to AND gate F2 in output gate circuit 108. Gate F2, however, is disabled by the low condition on lead 202. The 512 kb/s signal from the standby clock is therefore blocked from output lead 110.

The 512 kb/s signal output of NAND gate D2 also toggles the 64-stage recycling register comprising flip-flop C5 and register C6 in pulse aligner circuit 107. Flip-flop C5 and register C6 are arranged as a recirculating shift register in the same way as flip-flop A5 and register A6. The recirculating shift register also recirculates a 1 bit at an 8 kHz rate. This 1 bits, when it appears at output terminal B64 in register C6, is recycled to flip-flop C5 in the same manner as the 1 bit in register A6 is recycled to flip-flop A5. At the same time the 1 bit is passed to AND gate F5 in output gate 108. Gate F5, however, is blocked by the low condition from lead 202. The recirculating 1 bit, when clocked to the 32nd stage, appears at output lead B32. Output lead B32 extends to AND gate F9 which at this time is blocked by the low condition on lead 202. Accordingly, the output of the recirculating shift register in pulse aligner 106, being blocked, cannot be passed to output lead 111.

The 8 kb/s signal on lead 8K I from the master clock is applied to the J input of flip-flop A1 in clock pulse interface circuit 102 and inversely applied to the K input of flip-flop A1. Flip-flop A1 is toggled by the inverted 512 kb/s signal at the output of inverter B1. Flip-flop A1 is therefore placed in the set state one 512 bit interval after the initiation of the 8 kb/s signal and cleared one 512 bit interval after the termination of the 8 kb/s signal. When set, the Q output of flip-flop A1 goes high, returning to the low condition when the flip-flop is cleared to provide a wave depicted as timing wave A1 (or C1) in FIG. 5. When set, flip-flop A1 partially enables NAND gate A2 whose other input is inversely connected to the 8 kb/s signal on lead 8K I. At the termination of the 8 kb/s signal and for one 512 bit interval NAND gate A2 is fully enabled to provide a strobe pulse shown as timing wave A2 (or C2) in FIG. 5. This strobe pulse is passed via lead 213 to mode logic circuit 101, phase calculator circuit 109, pulse add-/delete circuit 104 and pulse aligner circuit 106.

The strobe pulse passed to pulse aligner circuit 106 is applied to NAND gate A7. Gate A7 is presently enabled by the high condition on lead 201 and thereupon passes the strobe pulse, inverted, to NAND gate A3 and via lead 301 to NAND gate C3 in pulse aligner circuit 107.

NAND gate A3 is presently enabled by the normal high condition on lead 302, as described hereinafter. NAND gate A3 therefore passes the stobe pulse to NAND gate A4 which is enabled by the high condition on lead 207. The output of NAND gate A4 extends to the set input of flip-flop A5 and the clear input of all the stages in register A6. Accordingly, the inverted strobe pulse output of gate A4 inserts a 1 bit into flip-flop A5 and inserts 9 bits into all of the register stages of register A6. It is recalled that the strobe pulse occurs after the termination of the 8 kb/s signal from the master clock. At the termination of the 8 kb/s signal the 1 bit should have just been recycled to flip-flop A5. Therefore, the operation of NAND gate A4 ensures that this recycling takes place and thus aligns the 64-stage recirculating register in pulse aligner circuit 106 with the 8 kb/s signal from the master clock.

The inverted strobe pulse output of NAND gate A7 is also passed via lead 301 to NAND gate C3, as previously noted. The other input of gate C3 is connected to NAND gate C7 which is disabled by the low condition on lead 202. The output of gate C7 is thereupon high, enabling gate C3 to pass the strobe pulse from gate A2 to NAND gate C4. The other input to NAND gate C4 is connected to lead 207 which is high. NAND gate C4 is therefore enabled to pass the strobe pulse, inverted, to the set input of flip-flop C5 and the clear inputs of all the stages in register C6. This results in the insertion of a 1 bit in flip-flop C5 and the insertion of 0 bits in all of the stages of register C6. Accordingly, the recirculating register in pulse aligner 107 is exactly aligned with the recirculating register in pulse aligner 106 and both registers are exactly aligned with the 8 kb/s signal derived from the master clock.

The 8 kb/s signal on lead 8K II from the standby clock is passed to the J input of flip-flop C1 in clock pulse interface 103 and inversely passed to the K input of the flip-flop. The Q output of flip-flop C1 and the 8 kb/s signal on lead 8K II, inverted, are applied to AND gate C2. AND gate C2 therefore develops the 8 kb/s strobe pulse from the standby clock in the same manner that gate A2 develops the strobe pulse from the 8 kb/s master clock signal. This strobe pulse is passed to NAND gate C7 which is presently disabled by the low condition on lead 202. The strobe pulse is thus blocked and the output of NAND gate is maintained high to maintain gate C3 enabled to pass the strobe pulse from gate A7, as previously described. At the same time, the high output of gate C3 is passed via lead 302 to maintain NAND gate A3 enabled. Thus, NAND gate A3 can pass the strobe pulse output of NAND gate A7 therethrough, as previously described.

Accordingly, after the termination of the 8 kb/s signal from the master clock and for the one 512 bit interval of the inverted 512 kb/s signal at the output of inverter B1, NAND gate A2 produces the strobe pulse which is passed through gate A7 to gates A3 and C3. The pulse is then passed through NAND gates A4 and C4 to align the 1 bits in the recirculating registers in pulse aligner circuits 106 and 107. The 1 bits continue to circulate through the registers and back to the inputs of flip-flops A5 and C5 under control of the respective 512 kb/s clocking pulses and then again concurrently aligned by the strobe pulse from the master clock.

When the master clock is operating properly and mode logic circuit 101 is in the normal master clock mode, lead 201 is high and lead 202 is low, as previously described. Gate G12 in phase calculator logic circuit 109 is therefore enabled and gate G13 is disabled. Similarly, gates G4 and G10 are enabled and gates G3 and G9 are disabled.

With gate G12 enabled, the 512 kb/s pulse from inverter B1 derived from the master clock will pass, inverted, therethrough and through NOR gate G14 to the toggle input of binary counter G15. Binary counter G15 contains six stages enabling it to provide a count of 64. The strobe pulses on lead 214 which, as previously described, are derived from the 8 kb/s clock output of the standby clock are passed through gate G10 and through NOR gate G11 to the clear inputs of the several stages in counter G15. As a consequence, counter G15 is cleared at the termination of each 8 kHz clock pulse from the standby clock and thereafter advanced by the 512 kb/s pulses from the master clock. Binary counter G15 therefore cycles through its 64 counts aligned with the standby clock 8 kb/s pulses when mode logic 101 is in the normal master clock mode.

The final stage output of binary counter G15 is applied to NAND gate G7 and inversely applied to NAND gate G6. Since this output constitutes the most significant bit of the 64 counts, a 0 bit is generated during the initial half cycle of the counter and a 1 bit during the terminal half cycle. Accordingly, G6 is partially enabled during this initial half cycle and G7 is partially enabled during the terminal half cycle. Gates G6 and G7 are further enabled by the high condition on lead 207 derived from the Q output of flip-flop E7 which, as previously described, is in the set state when mode logic circuit 101 is in the normal master clock mode.

As previously noted, AND gate G4 is enabled during the normal master clock mode and strobe pulses on lead 213 derived from the master clock 8 kb/s signal are passed through AND gate G4 and through OR gate G5 to NAND gates G6 and G7. Thus, if the 8 kb/s clock pulse from the standby clock leads, in phase, the 8 kb/s clock pulses from the master clock, the count of binary counter G15 will be less than 32 and the gate G6 will be enabled when the strobe pulse from the master clock is passed through OR gate G5. This pulse is therefore passed inverted through gate G6 to set flip-flop G8. On the other hand, if the 8 kb/s clock pulse from the standby clock lags the 8 kbs clock pulse from the master clock, the count in counter G15 exceeds 31 and gate G7 is enabled when the strobe pulse from the master clock is passed through OR gate G5. This strobe pulse is therefore passed through gate G7 to clear flip-flop G8. Accordingly, when mode logic circuit 101 is in the normal master clock mode, flip-flop G8 is set when the 8 kb/s clock signal from the standby clock leads in phase the 8 kb/s clock signal from the master clock and is cleared when the standby 8 kb/s clock signal lags in phase the master 8 kb/s clock signal. When flip-flop G8 is set, the Q output is high and this high condition is passed to lead 209. When flip-flop G8 is cleared, the $\overline{Q}$ is high and this high condition is passed to output lead 210.

Assume now that a malfunction occurs in the master clock and the standby clock is operating properly. In this event 1 bits are applied to lead INHIBIT I and 0 bits are maintained on lead INHIBIT II. The 1 bits on lead INHIBIT I are passed to AND gate E5 which, as previously described, has been enabled by the clearing of flip-flop E2. The initial bit is passed through NOR gate E6 to now clear flip-flop E7. The clearing of flip-flop E7 now provides a high condition to lead 208 and a low condition to lead 207.

The 1 bits on lead INHIBIT I are also provided, inverted, through OR gate E13 to NAND gate E11. The consequent low input to gate E11 drives the output high. This high output together with 1 bits on lead INHIBIT I enables NAND gate E12 which drives the output of gate E12 low. As a consequence, a high condition is applied to lead 202 and a low condition is applied to lead 201.

Mode logic circuit 101, with high conditions on leads 202 and 208 and low conditions on leads 201 and 207, is indicating that it has entered the standby clock correction mode. The low condition on lead 207 disables gates G6 and G7 to preclude any change in the condition of flip-flop G8; the flip-flop thereby being maintained to either indicate a leading or lagging standby clock relative to the master clock and thereby relative to the alignment of the recirculating shift registers in pulse aligners 106 and 107. The low condition on lead 207 also blocks gates A4 and C4 precluding the passage of the strobe pulse whereby the recirculating registers are no longer aligned with the strobe pulse and now recycle solely under control of the 512 kb/s toggle pulses provided through gates B2 and D2 to leads 211 and 212.

The high condition on lead 202 now enables gates F2, F5 and F9 and the low condition on lead 201 disables gates F1, F4 and F7. As a consequence, the 512 kb/s pulses on lead 211 provided by the master clock are blocked by gate F1 and the 512 kb/s pulses on lead 212 provided by the standby clock are now passed through gate F2 and NOR gate F3 to output lead 110. The setting and clearing of flip-flop F10, previously provided by register A6 via gates F4 and F7, is now provided by the B64 output of shift register C6 through AND gate F5 and NOR gate F6 and by the B32 output of register C6 through AND gate F9 and NOR gate F8. The setting and clearing of flip-flop F10, as previously described, provides the 8 kb/s output to output lead 111 by way of inverter F1.

The low condition on lead 201 also disables gate A7 and the high condition on lead 202 enables gate C7. Gate A7 output is therefore maintained high to enable gate A3 and to enable gate C3 via lead 301. With gate C7 enabled, 8 kHz strobe pulse on lead 214 derived from the standby clock via gate C2 is now passed through gate C7 and through gate C3 to gate C4 and, via lead 302, through gate A3 to gate A4. As a consequence, when gates A4 and C4 are again enabled, the recirculating registers will be aligned by the 8 kHz strobe pulses derived from the standby clock.

Assume now that prior to the master clock failure the 8 kHz pulse from the standby clock lagged the 8 kHz pulse from the master clock and therefore lagged the phase of the recirculating registers. As a consequence, flip-flop G8 was cleared and a high condition was applied to lead 210. The high condition on lead 210 enables AND gate D3 in pulse add/delete circuit 105 and AND gate D3 passes the strobe pulse on lead 214 derived from the standby clock to NAND gate D4.

Figure 5:
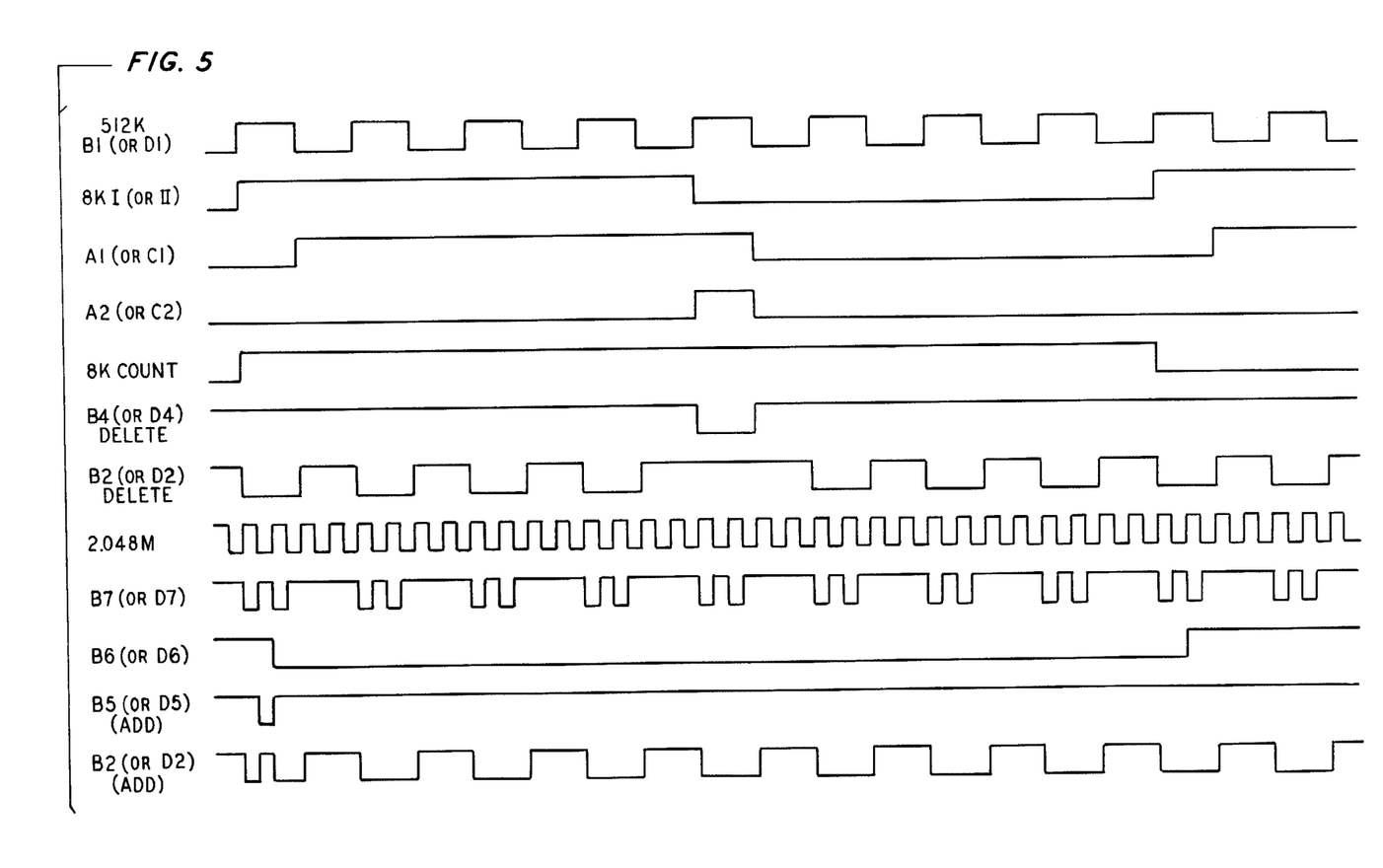
FIG. 5 discloses timing waves produced by various equipment in the clock control system.

NAND gate D4 is partially enabled by the high condition on lead 208 (from the $\overline{Q}$ output of flip-flop E7) and fully enabled by the pulse on lead 204 provided by counter 206 which, as previously described, is high for one cycle of a plurality of the 8 kb/s clock signals derived from the standby clock (as shown in timing wave 8K count). Accordingly, during this one cycle, the strobe pulse passed through gate D3 is inversely provided at the output of NAND gate D4, to provide a periodic pulse shown as timing wave B4 (or D4) in FIG. 5. As can be seen in FIG. 5, the D4 timing wave pulse coincides with one of the 512 kb/s pulses from inverter D1 which is derived from the master clock. Since the D4 inverted pulse disables gate D2, the passage of the coinciding 512 kb/s pulse is consequently blocked. As a consequence, the output of gate D2 has one of the 512 kb/s pulses omitted each time the D4 pulse is generated, as shown in timing wave B2 (or D2). The omission of this pulse results in the omission of the application of one toggle pulse via lead 212 to shift register C6 and flip-flop C5 whereby the phase of the output of shift register C6 is retarded 1/64th of an 8 kb/s cycle. This therefore tends to slow the recycling of the recirculating shift register, at a gradual rate, to compensate for the 8 kHz standby clock which lags the register.

The 512 kb/s signal with the pulse omitted at the output of gate D2 is also passed to output lead 110 by way of gates F2 and F3, as previously described, and of course the 8 kb/s signal, now retarded 1/64th of the cycle, is passed to flip-flop F10 and the output of flip-flop F10 is then passed to output 111. Upon the generation of the next counter 206 pulse, this process is again repeated by the strobe pulse to omit another one of the 512 kb/s pulses and again retard the phase of the 8 kb/s output of shift register C6 by 1/64th of a cycle.

This process continues until the phase of the output of shift register C6 corresponds to the phase of the strobe pulse on lead 214. When this occurs, the strobe pulse appears at the output of gate C2 and then on lead 214 at the same time that the B64 output pulse of register C6 is recirculated back to flip-flop C5. The Q output of flip-flop C5 therefore applies a pulse to lead 305 at the same time gate C2 applies a pulse to lead 214. The coincidence of these two pulses enables AND gate E9 in mode logic 101 since the third input to the gate extends to lead 202 which is presently high. The enabling of gate E9 provides a high condition at its output. This high condition is inverted by NOR gate E10 and the resultant negative condition sets flip-flop E7. The setting of flip-flop E7 restores the high condition on lead 207 and the low condition on lead 208. With leads 207 and 202 having high potentials applied thereto and leads 208 and 201 having low conditions applied thereto, mode logic circuit 101 is advanced to the standby clock mode.

Assume now that when the master clock failure occurred, and the mode logic circuit went to the standby clock correction mode, the strobe pulse from the standby led the phase of the recirculating registers. In that event, flip-flop G8 was in the set condition, the potential on lead 209 was high and the potential on lead 210 was low. Flip-flop E7 is cleared when mode logic circuit 101 goes to the correction mode, placing a high condition on lead 208. The high conditions on leads 209 and 208 partially enable gate D5 in pulse aligner 107. Another input to gate D5 is provided by NAND gate D7 which is enabled by each 512 kb/s pulse, inverted, as provided by the standby clock via inverter D1.

The other input of NAND gate D7 is derived from lead 2.048M II which extends to the countdown circuit in the standby clock. More specifically, lead 2.048M II extends from a stage in the standby clock countdown circuit prior to the stage that provides the 512 kb/s pulse to lead 512K II. Advantageously, the b 2.048M II lead is connected to the prior stage which provides an output having four times the repetition rate of the 512 kb/s pulse to thereby provide a 2.048 megabit per second pulse wave shown as timing wave 2.048M in FIG. 5. This 2.048 Mb/s pulse wave is passed through NAND gate D7 during each positive pulse of the inverted 512 kb/s output of inverter D1 to provide timing wave B7 (or D7) shown in FIG. 5. This pulse output of NAND gate D7 is passed to the toggle input of flip-flop D6 and to an input of NAND gate D5.

The counter 206 output pulse, previously described, is passed to the J input of flip-flop D6, is also passed, inverted, to the K input of flip-flop D6, and is passed to a final input of gate D5. Since the counter 206 (8K count) pulse appears for only one cycle of a plurality of cycles of the 8 kHz wave on lead 8K II, a low condition is therefore generally applied by counter 206 to NAND gate D5 to maintain the gate disabled. The counter 206 pulse also normally provides a low condition to the J input of flip-flop D6 and the inverse or a high condition to the K input of flip-flop D6 which is therefore toggled to the clear condition. The $\overline{Q}$ output of flip-flop D6 therefore is normally high and this high signal is also passed to NAND gate D5.

Upon the initiationn of the counter 206 (8K count) pulse, the counter applies a high condition to gate D5 and simultaneously applies a high condition to the J input of flip-flop D6. At this moment, the output of NAND gate D7 has gone low in response to the 2.048 megabit pulse. This low output of NAND gate D7 maintains at least one low input to NAND gate D5 to maintain the latter gate disabled.

When the 2.048 megabit pulse is removed, the output of NAND gate D7 goes high for one 2.048 megabit pulse interval. During this interval all of the inputs to NAND gate D5 are high and the output of NAND gate D5 goes low as shown in timing wave B5 (or D5). At the termination of this 2.048 megabit pulse interval, the output of NAND gate D7 again goes low to disable NAND gate D5. The negative pulse output of gate D7 also toggles flip-flop D6 to the set condition since a high condition is applied to the J input by the 8K count pulse. Flip-flop D6 set passes a low condition to its $\overline{Q}$ output to maintain NAND gate D5 disabled. As a consequence, the output of NAND gate D5 constitutes a single negative pulse having the width of a 2.048 megabit pulse and occurring during one cycle of a plurality of cycles of the 8 kHz wave.

As previously described, the output of NAND gate D2 inversely follows the 512 kb/s pulse output of gate D1. The output of NAND gate D5, however, goes low (for one 2.048 megabit pulse interval) during the 512 kb/s pulse. Accordingly, the output of NAND gate D2, after initially going low in response to the 512 kb/s pulse output of gate D1, goes high in response to the gate D5 pulse and returns low when the gate D5 pulse terminates to insert an additional pulse in the 512 kb/s pulse output of gate D2 as shown in timing wave B2 (or D2). As a consequence, gate D2 applies an extra pulse to the toggle inputs of shift registers C6 and flip-flop C5. This has the effect of advancing the phase of the recirculating shift register by 1/64th of the cycle of the 8 kb/s signal output of the register to compensate for the leading strobe pulse derived from the standby clock. This phase advance will be repeated each time the 8K count pulse is generated and until the phase of the recirculating shift register is aligned with the strobe pulse. When the phases coincide, AND gate E9 is enabled, as previously described, flip-flop E7 is set and mode logic circuit 101 is placed in the standby clock mode as previously described.

The setting of flip-flop E7, upon the advancing of mode logic circuit 101 to the standby clock mode, disables gates D4 an D5 and gates B4 and B5. Gates B2 and D2 are thereby maintained enabled permitting the 512 kb/s pulses from inverters B1 and D1 to pass without the addition or deletion of pulses. Flip-flop E7 also enables NAND gates A4 and C4. With NAND gate C4 enabled the strobe pulse from the standby clock now passed through NAND gate C7 is applied through NAND gate C4 to shift register C6 and flip-flop C5 to maintain the recirculating shift register in pulse aligner 107 aligned with the strobe pulse. At the same time the strobe pulse output of NAND gate C7 is passed through lead 302 and NAND gate A4 to shift register A6 and flip-flop A5 to maintain the recirculating shift register in pulse aligner 106 aligned with the strobe pulse. Thus, the two recirculating shift registers are now aligned with the standby clock.

The setting of flip-flop E7 also partially enables gates G6 and G7. Since, in the standby clock mode, a high potential is applied to lead 202 and a low potential is applied to lead 201, gates G3, G9 and G13 are enabled while gates G4, G10, and G12 are disabled. As a consequence, the G15 binary counter is driven by the 512 kb/s pulses derived from the standby clock and aligned with the strobe pulses derived from the master clock. The strobe pulse derived from the standby clock is now passed through AND gate G3 and OR gate G5 to set or clear flip-flop G8 which now calculates whether the master clock leads or lags the standby clock.

Mode logic circuit 101 remains in the standby clock mode with the recirculating register in pulse aligner 107 aligned with the strobe pulse derived from the standby clock with the 512 kb/s output signal on lead 110 obtained from the 512 kb/s pulse derived from the standby clock and with the 8 kHz signal on lead 111 derived from the output signal of pulse aligner 107. In the event, however, that the master clock failure is corrected, 0 bits are again applied to lead INHIBIT I. This disables NAND gate E12, restoring the high condition on lead 201. High conditions are now applied to NAND gate E11, as previously described, restoring the low condition on lead 202.

The 0 bits on lead INHIBIT I are also inversely passed through NOR gate E15 to AND gate E4. AND gate E4, previously enabled by the setting of flip-flop E2, passes the bit through NOR gate E6 to clear flip-flop E7. Thereafter, the 8K count pulse on lead 203 passes through NOR gate E3, which is enabled by the high condition on lead 201, to clear flip-flop E2. With flip-flop E7 cleared, with a high condition on lead 201 and with a low condition on lead 202, mode logic circuit 101 advances to the master clock correction mode state.

In the master clock correction mode state the 512 kb/s output signal on lead 110 is obtained from the 512 kb/s timing wave derived from the master clock and the 8 kHz timing signal on lead 111 is derived from the output signal of pulse aligner 106 in the same manner as these signals are provided during the master clock mode state. With lead 208 having a high potential applied thereto and lead 207 having a high potential applied thereto, pulse add/delete circuit 104 now procedes to add or delete 512 kb/s pulses in accordance with the phase difference calculated by phase calculator 109; pulse add/delete circuit 104 operating to add or delete pulses in the same manner as previously described for the operation of pulse add/delete circuit 105. The low condition on lead 207 blocks gates A4 and C4 whereby, as previously described, the recirculating registers in pulse aligners 106 and 107 are no longer aligned with the strobe pulses. Accordingly, the phase of the recirculating register in pulse aligner 106 is modified until its output pulse is aligned with the strobe pulse on lead 213. This pulse coincidence is passed through AND gate E8 which has been enabled by the high condition on lead 201. The pulse passed through gate E8 is applied through NOR gate E10 to set flip-flop E7. The setting of flip-flop E7 advances mode logic circuit 101 to the normal master clock state wherein the recirculating registers are aligned with the strobe pulse derived from the master clock and the output 512 kb/s signal is derived from the 512 kb/s timing wave derived from the master clock. The circuit is therefore returned to the initially described normal master clock state.

Although a specific embodiment of the invention has been shown and described, it will be understood that various modifications may be made without departing from the spirit of this invention.

We claim:

1. A clock control circuit having first and second states and an intermediate correction state and including means for producing pulse signals, first and second sources of timing signals, means for aligning the phase of the producing means to coincide with the phase of signals applied thereto, means effective during the first state for applying signals derived from the first source timing signals to the producing means and means effective during the second state for applying signals derived from the second source timing signals to the producing means;

characterized by means effective during the intermediate correction state for precluding the application signals to the producing means and for modifying the phase of the producing means incremental quantities to compensate for phase differences between the second source timing signals and the first source timing signals.

2. A clock control circuit in accordance with claim 1 wherein means effective during the first state places the clock circuit in the intermediate correction state in response to a malfunction indication and means effective during the intermediate correction state places the clock circuit in the second state in response to coincidence in phase of the signals derived from the second source and the producing means.

3. A clock control circuit in accordance with claim 2 wherein the producing means includes means responsive to the aligning means for initiating an operation cycle to coincide with the application of each signal to the producing means and means for producing a pulse in response to the operation cycle, and means responsive to the termination of each operation cycle for initiating the next operation cycle in the absence of the application of the signal thereto.

4. A clock control system in accordance with claim 3 including means for calculating the phase relationship of the signals derived from the first and second sources and wherein the modifying means includes means for advancing and retarding the phase of the operation cycle in accordance with the calculated phase relationship.

5. A clock control system comprising:
first and second sources of timing signals;
first and second means for producing pulse signals;
first means for aligning the phases of the first and second producing means to coincide with the phase of signals derived from the first source;

means responsive to a malfunction indication for disabling the first aligning means and for modifying the phase of the second producing means incremental quantities; and second means responsive to coincidence of the phases of the second producing means and signals derived from the second source for aligning the phases of the first and second producing means to coincide with the phase of signals derived from the second source.

6. A clock control system in accordance with claim 5 and further including means responsive to the first producing means pulse signals for generating clock signals, the generating means further including means responsive to the malfunction indication for rendering the generating means unresponsive to the first producing means pulse signals and responsive to the second producing means pulse signals.

7. A clock control system in accordance with claim 5 including means for calculating the phase relationship of the signals derived from the first and second sources and wherein the periodically modifying means includes means for advancing and retarding the phase of the producing means in accordance with the calculated phase relationship.

8. A clock control sytem in accordance with claim 7 wherein the first and second source timing signals include a low speed signal train and a high speed signal train having $n$ times the repetition rate of the low speed train, the signals derived from the first and second sources are derived from the low speed trains thereof, and each of the pulse producing means includes means for producing the pulse signal in response to a count of $n$ high speed signals from a corresponding one of the first and second sources.

9. A clock control system in accordance with claim 8 wherein the first and second means for aligning the first and second producing means includes means responsive to the signals derived from the low speed trains for initiating new counts by the producing means.

10. A clock control system in accordance with claim 8 wherein the means for advancing and retarding the phase of the producing means includes means for adding and deleting high speed signals.

* * * * *